United States Patent
Sagara et al.

(10) Patent No.: US 10,428,232 B2
(45) Date of Patent: Oct. 1, 2019

(54) INK SET, IMAGE FORMING METHOD, AND IMAGE FORMING APPARATUS

(71) Applicants: Amika Sagara, Tokyo (JP); Michihiko Namba, Kanagawa (JP); Hiroaki Takahashi, Kanagawa (JP); Kiminori Masuda, Tokyo (JP)

(72) Inventors: Amika Sagara, Tokyo (JP); Michihiko Namba, Kanagawa (JP); Hiroaki Takahashi, Kanagawa (JP); Kiminori Masuda, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 22 days.

(21) Appl. No.: 15/280,532

(22) Filed: Sep. 29, 2016

(65) Prior Publication Data

US 2017/0114236 A1  Apr. 27, 2017

(30) Foreign Application Priority Data

Oct. 23, 2015 (JP) .................................. 2015-209066

(51) Int. Cl.
*B41J 2/01* (2006.01)
*C09D 11/102* (2014.01)
(Continued)

(52) U.S. Cl.
CPC .............. *C09D 11/102* (2013.01); *B41J 2/01* (2013.01); *C09D 11/037* (2013.01); *C09D 11/10* (2013.01);
(Continued)

(58) Field of Classification Search
None
See application file for complete search history.

(56) References Cited

U.S. PATENT DOCUMENTS

2007/0037901 A1   2/2007   Kanaya et al.
2010/0178425 A1*  7/2010   Ooishi ................ C09D 11/322
                                                                427/256
(Continued)

FOREIGN PATENT DOCUMENTS

JP   2006-070105   3/2006
JP   2007-051176   3/2007
(Continued)

OTHER PUBLICATIONS

Extended European Search Report dated Dec. 5, 2016 in patent application No. 16190631.8.

*Primary Examiner* — Erica S Lin
(74) *Attorney, Agent, or Firm* — Oblon, McClelland, Maier & Neustadt, L.L.P.

(57) ABSTRACT

An ink set includes an ink A including water, an organic solvent A, a self-dispersible pigment, an anionic resin particle, and an amine compound having a boiling point of 120 degrees C.-200 degrees C. and an ink B including water, an organic solvent B, and a resin-coated pigment, wherein when the mass content of the amine compound is determined as 1, the mass content of the anionic resin particle is 1-100 and the mass content of the resin-coated pigment is 10-200, while the mass content of the anionic resin particle and the mass content of the resin-coated pigment are respectively based on the content per unit of mass of the ink A and the content per unit of mass of the ink B.

17 Claims, 1 Drawing Sheet

(51) Int. Cl.
    *C09D 11/10*   (2014.01)
    *C09D 11/326*  (2014.01)
    *C09D 11/40*   (2014.01)
    *C09D 11/037*  (2014.01)
    *C09D 11/322*  (2014.01)
    *C09D 11/324*  (2014.01)
    *C09D 11/38*   (2014.01)

(52) U.S. Cl.
    CPC .......... *C09D 11/322* (2013.01); *C09D 11/324* (2013.01); *C09D 11/326* (2013.01); *C09D 11/38* (2013.01); *C09D 11/40* (2013.01)

(56) References Cited

U.S. PATENT DOCUMENTS

| | | |
|---|---|---|
| 2010/0245416 A1 | 9/2010 | Ohshima et al. |
| 2012/0046244 A1* | 2/2012 | Rogers ............... A61K 47/4803 514/75 |
| 2013/0057625 A1 | 3/2013 | Yamazaki |
| 2013/0106945 A1* | 5/2013 | Ikeda ................. C09D 11/326 347/20 |
| 2013/0169724 A1 | 7/2013 | Gotou |
| 2013/0307912 A1 | 11/2013 | Masuda et al. |
| 2014/0204156 A1 | 7/2014 | Gotou |
| 2015/0103116 A1 | 4/2015 | Gotou |
| 2015/0166808 A1 | 6/2015 | Yamazaki |
| 2015/0174920 A1 | 6/2015 | Namba et al. |
| 2015/0258796 A1 | 9/2015 | Tamai et al. |
| 2015/0259567 A1 | 9/2015 | Tamai et al. |
| 2015/0283828 A1 | 10/2015 | Aoai et al. |
| 2015/0367667 A1 | 12/2015 | Aoai et al. |
| 2016/0024323 A1 | 1/2016 | Tamai et al. |
| 2016/0144620 A1 | 5/2016 | Masuda et al. |
| 2016/0222234 A1 | 8/2016 | Matsuyama et al. |
| 2016/0264807 A1 | 9/2016 | Sagara et al. |

FOREIGN PATENT DOCUMENTS

| | | |
|---|---|---|
| JP | 2009-144174 | 7/2009 |
| JP | 2010-155359 | 7/2010 |
| JP | 2012-180425 | 9/2012 |
| JP | 2015-067802 | 4/2015 |
| JP | 2016-108441 A | 6/2016 |

* cited by examiner

INK SET, IMAGE FORMING METHOD, AND IMAGE FORMING APPARATUS

CROSS-REFERENCE TO RELATED APPLICATIONS

This patent application is based on and claims priority pursuant to 35 U.S.C. § 119 to Japanese Patent Application No. 2015-209066, filed on Oct. 23, 2015, in the Japan Patent Office, the entire disclosures of which is hereby incorporated by reference herein.

BACKGROUND

Technical Field

The present invention relates to an ink set, an image forming method, and an image forming apparatus.

Description of the Related Art

Typically, small droplets of ink are jetted by inkjet or sprayed by a spray to the surface of a medium to form ink images or coat with ink.

In particular, color images can be easily formed utilizing inkjet recording methods. In addition, the inkjet recording method is widely used in terms of low running costs, etc. As the ink for inkjet recording, aqueous dye ink in which dyes are dissolved in an aqueous medium or solvent-based ink in which oil-soluble dyes are dissolved in an organic solvent are used. In general, taking into account safety and environment, aqueous dyes dissolved in water or water and a water-soluble organic solvent are used in home and office. However, recorded images formed with ink including such water-soluble dyes are inferior with regard to water resistance and weatherability.

Recently, aqueous pigment ink in which pigment particulates are dispersed in water has now been appealing. Ink for inkjet recording using a water dispersible pigment is known to be excellent with regard to water resistance and weatherability. However, if images are recorded on gloss paper with pigment ink, the pigment, which serves as a coloring material, does not permeate into the inside of an ink-receiving layer but remains on the surface of the gloss paper, forming a coated film thereon. Therefore, in comparison with recording with pigment ink on plain paper or recording with dye ink which permeates into the inside of an ink-receiving layer, recording on gloss paper with pigment ink is inferior with regard to abrasion resistance on the recording surface. This leads to problems such that when the recording surface is abraded, the printed film is peeled off and the abraded material causes contamination.

SUMMARY

According to the present invention, provided is an improved ink set which includes an ink A including water, an organic solvent A, a self-dispersible pigment, an anionic resin particle, and an amine compound having a boiling point of 120 degrees C.-200 degrees C. and an ink B including water, an organic solvent B, and a resin-coated pigment, wherein when the mass content of the amine compound is determined as 1, the mass content of the anionic resin particle is 1-100 and the mass content of the resin-coated pigment is 10-200, while the mass content of the anionic resin particle and the mass content of the resin-coated pigment are respectively based on the content per unit of mass of the ink A and the content per unit of mass of the ink B.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
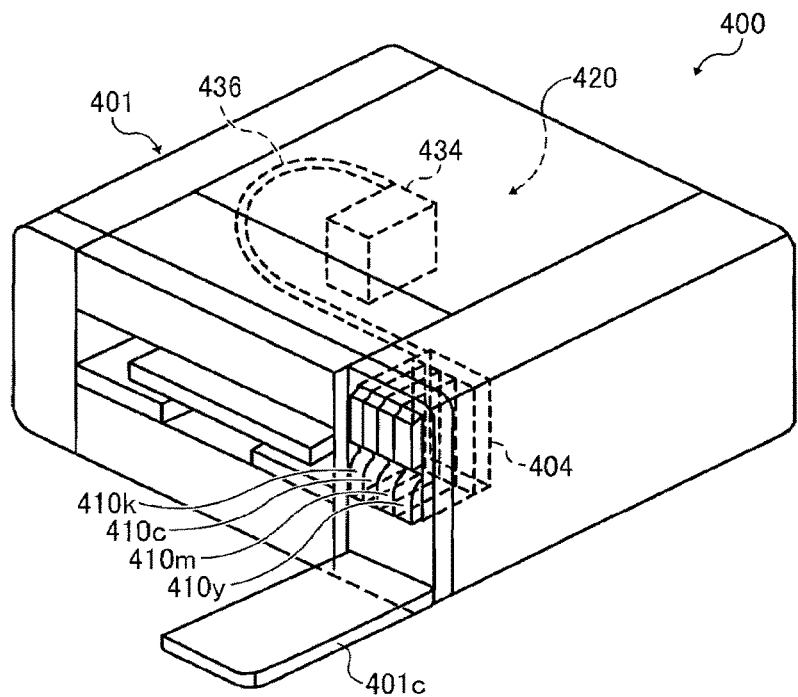
FIG. 1 is a diagram illustrating an example of the recording device using the ink set of the present disclosure according to an embodiment of the present disclosure.

The accompanying drawings are intended to depict example embodiments of the present invention and should not be interpreted to limit the scope thereof. The accompanying drawings are not to be considered as drawn to scale unless explicitly noted.

DESCRIPTION OF THE EMBODIMENTS

In the case of printing on gloss paper, the recorded matter has to have good abrasion resistance. Resins selected as components for ink for inkjet recording having such good abrasion resistance involve significant viscosity increase at the time of moisture evaporation. This leads to clogging of the ink in a nozzle due to drying of the ink or defective discharging due to adherence of the ink around a nozzle. Moreover, thickened and agglomerated waste ink cause deterioration of maintenance property of the ink.

In the present disclosure, "ink including water, an organic solvent A, an anionic resin particle, and an amine compound having a boiling point of 120 degrees C.-200 degrees C." is defined as ink A and "ink including water, an organic solvent B, and a resin-coated pigment is defined as ink B.

When the content (based on mass) of the amine compound in the ink A is determined as 1, the ink A and the ink B satisfying the following requisites are used as the ink constituting the ink set.

Requisite

Ink A in which the content of the anionic resin particle is 1-100.

Ink B in which the content of the resin-coated pigment is 10-200.

When the ink A contains both the self-dispersible pigment having a poor abrasion resistance and the anionic resin particle, a film is formed in such a manner that the gap between the pigment and a medium and the gap between the pigments are filled to obtain a good abrasion resistance. In addition, in the ink B, usage of the resin-coated pigment enhances abrasion resistance.

According to this, both an image formed with single ink and an image formed with a combination of each ink have good abrasion resistance.

In addition, the ink A includes "the amine compound having a boiling point of 120-200 degrees C.".

Also, when the mass content of the amine compound in the ink A is determined as 1, the content of the anionic resin particle in the ink A is 1-100 and the content of the resin-coated pigment in the ink B is 10-200. For this reason, the ink set of the present disclosure is capable of striking a balance between dischargeability and maintenance property while suppressing a viscosity increase at the time of moisture evaporation.

When the ink A contains an amine compound having a boiling point higher than that of water, the amine compound is substituted as a counter ion of the anionic resin particle and prevents evaporation of the counter ion of the anionic resin particle even at the time of moisture evaporation, thereby maintaining a stable dispersion state. As a result, the viscosity increase of the ink is suppressed. Moreover, when the ink A and the ink B are mixed and treated as waster ink, the amine compound in the ink A increases pH of the entire of the waste ink and inhibits agglomeration and thickening of the ink B, so that the maintenance property is improved.

The ink set of the present disclosure contains at least one ink A and one ink B and furthermore an optional ink which does not belong to the ink A or the ink B.

The ink for use in the ink set of the present disclosure, the image forming method, the image forming apparatus, and the image formed matter using this image forming method are described in detail below.

Resin Particle

Resin particles contained in the ink help a coloring material to be fixed on a recording paper such as paper.

Therefore, each ink constituting the ink set preferably contains resin particles.

In addition, these resin particles are preferably water-dispersible.

Anionic Resin Particle

The ink A for use in the ink set of the present disclosure contains the anionic resin particle, which in particular makes it possible to strike a balance between improvement of abrasion resistance on gloss paper and good maintenance property. The anionic resin particle is a water-dispersible resin.

The kind of the anionic resin particle contained in the ink A has no particular limit and can be suitably selected to suit to a particular application. Specific examples thereof include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

It is possible to mix a resin emulsion in which the anionic resin particle formed of these resins is dispersed in water serving as a dispersion medium with materials such as a coloring material and an organic solvent to obtain the ink A. The anionic resin particle can be suitably synthesized or is available on the market.

In particular, it is preferable to add an anionic polyurethane resin as the anionic resin particle.

Polyurethane resins are a reaction product of polyisocyanate and polyol. As the feature of polyurethane resins, it has a soft segment formed of a polyol component having a weak agglomerating force and a hard segment formed of a urethane bond having a strong agglomerating force so that each of segment demonstrates its features. The soft segment is soft and strong for deformation such as drawing and bending of a substrate. On the other hand, the hard segment strongly adheres to a substrate and has good abrasion resistance. Therefore, if ink contains an anionic polyurethane resin, the ink is expected to have good abrasion resistance on gloss paper.

The polyurethane resin particle is water-dispersible and preferably used as an aqueous dispersion of O/W type in particular. In addition, such dispersions include water dispersions obtained by emulsifying a polyurethane resin using an emulsifying agent and water dispersions of self emulsification type obtained by introducing functional groups having features of emulsifying agents through copolymerization, etc.

Of these, in terms of excellent dispersion stability, self-dispersible anionic polycarbonate-based or polyester-based polyurethane resin aqueous dispersions are preferable. Furthermore, in terms of dispersion stability and storage stability of ink, polycarbonate-based polyurethane resin aqueous dispersion is more preferable.

Particle Diameter of Resin Particle

The particle diameter (D50) of resin particles including the anionic resin particle is related to viscosity of a liquid dispersion. If the compositions are the same, the viscosity of the same solid portion increases as the particle diameter (D50) decreases. In the present disclosure, in terms of image abrasion resistance at the time of recording on gloss paper, the particle diameter (D50) of resin particles is preferably 10 nm-200 nm and more preferably, nm-50 nm. Resin particles having a particle diameter (D50) of 10 nm or greater can prevent thickening of ink and improve storage stability. Furthermore, resin particles having a particle diameter (D50) of 100 nm or less can suppress image elongation. Resin particles having a particle diameter (D50) of 50 nm or less can provide good abrasion resistance.

The particle diameter (D50) of resin particles has little or no difference in resin particle dispersion and ink.

In addition, preferably the resin particle has a feature of fixing the coloring material on paper and forms a film at room temperature to improve fixing property of the coloring material. Therefore, the minimum film-forming temperature (MFT) of the water-dispersible resin is preferably 30 degrees C. or lower. In addition, when the glass transition temperature of the resin particle is not lower than −40 degrees C., viscosity of the resin film decreases, thereby preventing the printed matter from being tacky. Therefore, the glass transition temperature is preferably not lower than −40 degrees C. and more preferably, not lower than −30 degrees C.

The content of the resin particle in ink is 1-10 percent by mass and more preferably 1.5 percent by mass-5 percent by mass. When the content is not lower than 1 percent by mass, better abrasion resistance is obtained. When the content is not greater than 10 percent by mass, increase of viscosity at the time of moisture evaporation is suppressed and good maintenance property is maintained.

In addition to the anionic resin particle, resin particles of other aqueous dispersible resins can be used as the resin particle contained in ink in the present disclosure. As the resin particles of other aqueous dispersible resins, acrylic resins, styrene acrylic resins, acrylic silicone resins, and fluororesins are suitable. The resin particles of the other aqueous dispersible resins can be used for the ink B in the present disclosure.

Amine Compound

The present disclosure includes an amine compound having a boiling point of 120 degrees C.-200 degrees C. in the ink A. Also, when the mass content of the amine compound is determined as 1, the mass content of the anionic resin particle in the ink A is 1-100. For this reason, good maintenance property is achieved.

When the boiling point of the amine compound is lower than 120 degrees C., the amine compound tends to evaporate, which makes the resin unstable during moisture evaporation of ink so that viscosity of the ink increases. In addition, when the boiling point of the amine compound surpasses 200 degrees C., drying property at the time of image forming tends to deteriorate, resulting in degradation of the image quality.

Furthermore, the molecular mass of the amine compound is preferably not greater than 100. If the amine compound having a molecular mass of not greater than 100, the amine compound can easily serve as counter ions of the resin particle.

The amine compound includes, primary, secondary, tertiary, and quaternary amines and salts thereof. Quaternary amines represent compounds in which four alkyl groups are substituted to nitrogen atoms.

The preferable amine compound is represented by the following chemical formula I or II.

Chemical formula I

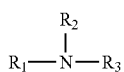

(I)

In the Chemical formula I, R1, R2, and R3 each, independently represent hydrogen atoms, alkoxy groups having 1-4 carbon atoms, alkyl groups having 1-6 carbon atoms, or hydroxyethyl groups, excluding the case where all of R1, R2, and R3 are 0 at the same time.

Chemical formula II

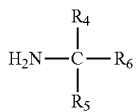

(II)

In the Chemical formula II, R4, R5, and R6 each, independently represent hydrogen atoms, methyl groups, ethyl groups, hydroxymethyl groups, and alkyl groups having 1-4 carbon atoms.

Specific examples of the compounds represented by Chemical formula I or II include, but are not limited to, 1-amino-2-propanol, 3-amino-1-propanol, 2-amino-2-methyl-1-propanol, N-methylethanol amine, N,N-dimethylethanol amine, and 2-amino-2-methyl-1,3-propane diol.

The mixing ratio of the resin particle to the amine compound is that when the mass content of the amine compound having a boiling point of 120 degrees C.-200 degrees C. in the ink A is determined as 1, the mass content of the anionic resin particle in the ink A is more preferably 5-50.

The content of the amine compound in the ink is not particularly limited. In terms of pH control of the ink, the content is preferably 0.01 percent by mass-5 percent by mass and particularly preferably 0.05 percent by mass-2 percent by mass.

In addition to the amine compound, other amine compounds are allowed to be used in combination in the ink A.

In addition, at the time of cleaning a nozzle head, the ink A and the ink B are mixed when both are discharged as waste ink. It is not preferable if this ink mixture agglomerates in terms of maintenance. The amine compound is considered to prevent this agglomeration of the ink mixture as pH regulator.

Coloring Material
Water-Dispersible Coloring Material

Next, water-dispersible coloring materials for use in the present disclosure are described.

As the water-dispersible coloring material, taking into account weatherability, pigments are mainly used. Optionally, dyes can be also added to control the color within an amount in which the weatherability is not degraded.

The content of the coloring material is preferably from 2 percent by mass-15 percent by mass and more preferably from 3 percent by mass-12 percent by mass as the solid portion in the entire ink. When the content is not less than 2 percent by mass, the color of the ink tends to deteriorate and the image density tend to decrease. When the content is not greater than 15 percent by mass, the ink is not thickened, so that the ink discharging performance is not degraded.

The pigments are not particularly limited and suitably selected to suit to a particular application. For example, inorganic pigments or organic pigments for black or color are suitably used.

To disperse a pigment in ink, for example, the following three methods are suitable.

1. A method in which a hydrophilic functional group is introduced into a pigment to obtain a self-dispersible pigment
2. A method in which the surface of a pigment is coated with a resin to disperse the pigment
3. A method in which a dispersant us used.

In the present disclosure, the self-dispersible pigment of 1 mentioned above is used for the ink A and the resin-coated pigment of 2 mentioned above is used for the ink B.

Self-Dispersible Pigment

To prepare a self-dispersible pigment by introducing a hydrophilic functional group into a pigment, for example, it is possible to add a functional group such as sulfone group and carboxyl group to the pigment (e.g., carbon) to disperse the pigment in water. An example of the pigment having a functional group is water-dispersible under no presence of a dispersant such that at least one functional group selected from the group consisting of —COOM, —SO$_3$M, —PO$_3$HM, —PO$_3$M$_2$, —CONM$_2$, —SO$_3$NM$_2$, —NH—C$_6$H$_4$—COOM, —NH—C$_6$H$_4$—SO$_3$M, —NH—C$_6$H$_4$—PO$_3$HM, —NH—C$_6$H$_4$—PO$_3$M$_2$, —NH—C$_6$H$_4$—CONM$_2$, and —NH—C$_6$H$_4$—SO$_3$NM$_2$ is present on the surface of the pigment and the counter ion M is quaternary ammonium ion.

Resin-Coated Pigment

In the dispersion method in which the surface of a pigment is coated with a resin, the pigment is encapsulated by micro-capsules to make the pigment dispersible in water. This can be referred to as a resin-coated pigment. In this case, the pigment to be added to ink is not necessarily completely coated with a resin. Pigments partially coated with the resin are allowed to be dispersed in the ink unless such pigments have an adverse impact.

The resin-coated pigment in the present disclosure is defined to include both a pigment and a resin that covers the surface of the pigment.

When the mass content of the amine compound in the ink A is determined as 1, the mass content of the resin-coated pigment in the ink B is 10-200. For this reason, the ink set has both good abrasion resistance on gloss paper and good maintenance property at the same time.

When the mass content of the amine compound in the ink A is determined as 1, the mass content of the resin-coated pigment in the ink B is more preferably 20-100.

Although the mechanism of how the mutual effect of the combination of the amine compound contained in the ink A and the resin-coated pigment is demonstrated is unclear, the inference is as follows.

In resin-coated pigments, in particular resin-coated pigment in which the coating resin has a hydrophilic group (acid dissociation group), proton addition occurs when pH in ink lowers. As a result, agglomeration of pigment occurs.

This occurs in the neutral area. The amine compound in the ink A increases pH of the entire ink so that pigment agglomeration is inferred to be suppressed.

The pigment can be an inorganic pigments and an organic pigment. Dyes can be used in combination in the ink of the present disclosure to control the color tone. However, it should be used within a range having no adverse impact on weatherability.

Specific examples of the inorganic pigments include, but are not limited to, titanium oxide, iron oxide, calcium oxide, barium sulfate, aluminum hydroxide, barium yellow, cadmium red, chrome yellow, and carbon black. Of these, carbon black is particularly preferable. Carbon black manufactured by, for example, a known method such as a contact method, a furnace method, and a thermal method can be used.

Various carbon black (Pigment Black 7), for example, channel black, furnace black, gas black, and lamp black are suitable. Examples thereof are Regal®, Black Pearls®, Elftex®, Monarch®, Mogul®, and Vulcan® (all available from Cabot Corporation).

Specific examples thereof include, but are not limited to, Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® 570, Black Pearls® L, Elftex® 8, Monarch® 1400, Monarch® 1300, Monarch® 1100, Monarch® 1000, Monarch® 900, Monarch® 880, Monarch® 800, Monarch® 700, Regal® 660, Mogul® L, Regal® 330, Regal® 400, and Vulcan® P. Other specific examples include, but are not limited to, SENSIJET BLACK SDP100 (SENSIENT), SENSIJET BLACK SDP1000 (SENSIENT), and SENSIJET BLACK SDP2000 (SENSIENT).

Specific examples of the organic pigments include, but are not limited to, azo pigments, polycyclic pigments, dye chelate, nitro pigments, nitroso pigments, and aniline black. Of these, azo pigments and polycyclic pigments are more preferable. Specific examples of the azo pigments include, but are not limited to, azo lake, insoluble azo pigments, condensed azo pigments, and chelate azo pigments. Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, and quinofuranone pigments. The dye chelate includes, but are not limited to, basic dye type chelate, and acidic dye type chelate.

Specific examples of the organic pigment include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 139, 150, 151, 153, 155, 180, 183, 185 and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36.

Moreover, since ion groups or ionizable groups are introduced to the surface of a pigment, pigments oxidized by using an oxidant are also usable.

For example, the surface-treated pigment preferably has an ionic property and in particular, anionicly-charged pigments are good.

The anionic functional groups are —COOM, —SO$_3$M, —PO$_3$HM, —PO$_3$M$_2$, —CONM$_2$, —SO$_3$NM$_2$, —NH—C$_6$H$_4$—COOM, —NH—C$_6$H$_4$—SO$_3$M, —NH—C$_6$H$_4$—PO$_3$HM, —NH—C$_6$H$_4$—PO$_3$M$_2$, —NH—C$_6$H$_4$—CONM$_2$, and —NH—C$_6$H$_4$—SO$_3$NM$_2$ as mentioned above. The counter ion M represents quaternary ammonium ion.

Specific examples of quaternary ammonium ions include, but are not limited to, tetramethyl ammonium ion, tetraethyl ammonium ion, tetrapropyl ammonium ion, tetrabutyl ammonium ion, tetra pentyl ammonium ion, benzyl trimethyl ammonium ion, benzyl triethyl ammonium ion, and tetrahexyl ammonium ion. Of these, tetraethyl ammonium ion, tetrabutyl ammonium ion, and benzyl trimethyl ammonium ion are preferable and tetrabutyl ammonium ion is particularly preferable.

Specific examples of the anionic functional groups include, but are not limited to, anionic polar groups such as a carboxylic acid group, a sulfonic acid group, a phosphoric acid group, an amide group, and a sulfone amide group. A carbonic acid group or p-amino benzoic acid group are preferable.

These anionic functional groups can be bonded to the surface of a pigment particle according to known methods.

In the present disclosure, since an aqueous dispersible coloring material having the functional group, the quaternary ammonium ion, etc. is used in the present disclosure, the aqueous dispersible coloring material demonstrates affinity in both water-rich ink and organic solvent-rich ink so that dispersion of the aqueous dispersible coloring material is maintained stable.

Depending on desired properties of a pigment, BET surface area is large as measured by nitrogen adsorption.

The pigment preferably has a surface of about 10 m$^2$/g-about 1,500 m$^2$/g, more preferably about 20 m$^2$/g-about 600 m$^2$/g, and most preferably about 50 m$^2$/g-about 300 m$^2$/g.

Unless a pigment having such a suitable surface area is available, it is possible to conduct general size reduction or optionally pulverize the pigment by using, for example, a ball mill, a jet mill, or ultrasonic wave to obtain a relatively small particle diameter.

The volume average particle diameter (D50) of the water dispersible coloring material is preferably 10 nm-200 nm in ink.

The proportion of the water-dispersible coloring material in the ink for inkjet recording is preferably 1-15 percent by mass and more preferably 2 percent by mass-10 percent by mass.

When the proportion is not less than 1 percent by mass, the coloring of the ink and image density are not degraded. When the proportion is not greater than 15 percent by mass, the ink does not thicken so that deterioration of discharging property can be prevented and moreover, it is preferable in terms of economy.

The ink A is preferably black ink using carbon black. The ink B is preferably color ink using color organic pigment. When the self-dispersible pigment using carbon black as the pigment is used for the ink A and the resin-coated pigment using color organic pigment is used for the ink B, image density becomes higher.

Ink

The organic solvent A, the organic solvent B, water, the coloring material, and additives for use in the ink A and the ink B are described next.

Organic Solvent A and Organic Solvent B

There is no specific limitation on the type of the organic solvent A and the organic solvent B used in the present disclosure. For example, water-soluble organic solvents are suitable. Specific examples thereof include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzyl ether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

Since the water-soluble organic solvent serves as a humectant and also imparts a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, di ethylene glycol monomethylether, diethyleneglycol monoethylether, diethyleneglycol monobutylether, tetraethyleneglycol monomethylether, propyleneglycol monoethylether, and polyol arylethers such as ethyleneglycol monophenylether and ethyleneglycol monobenzylether.

The polyol compounds having eight or more carbon atoms and glycolether compounds enhance the permeability of ink when paper is used as a print medium.

The proportion of the organic solvent in ink has no particular limit and can be suitably selected to suit a particular application.

In terms of the drying property and discharging reliability of the ink, the proportion is preferably from 10 percent by mass to 60 percent by mass and more preferably from 20 percent by mass to 60 percent by mass.

Water

The proportion of water in the ink has no particular limit. In terms of the drying property and discharging reliability of the ink, the proportion is preferably from 10 to 90 percent by mass and more preferably from 20 percent by mass to 60 percent by mass.

The proportion of the coloring material in ink is preferably from 0.1 to 15 percent by mass and more preferably from 1 percent by mass to 10 percent by mass in terms of enhancement of image density, fixability, and discharging stability.

Pigment Dispersion

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, pigment, pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably from 20 nm to 500 nm and more preferably from 20 nm to 150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the content is preferably from 0.1 percent by mass to 50 percent by mass and more preferably from 0.1 percent by mass to 30 percent by mass.

During the production, coarse particles are optionally filtered off with a filter, a centrifuge, etc. preferably followed by degassing.

The particle diameter of the solid portion in ink has no particular limit. For example, the maximum frequency in the maximum number conversion is preferably from 20 to 1,000 and more preferably from 20 nm to 150 nm to ameliorate the discharging stability and image quality such as image density. The solid portion includes resin particles, particles of pigments, etc. The particle diameter of the solid portion can be measured by using a particle size analyzer (Nanotrac Wave-UT151, manufactured by MicrotracBEL Corp).

Additive

Ink may further optionally contain a surfactant, a defoaming agent, a preservative and fungicide, a corrosion inhibitor, a pH regulator, etc.

Surfactant

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl silooxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily.

Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants has no particular limit. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitably synthesized surfactant and any product thereof available on the market is suitable. Products available on the market are obtained from Byc Chemie Japan Co., Ltd., Shin-Etsu Silicone Co., Ltd., Dow Corning Toray Co., Ltd., etc., NINON EMULSION Co., Ltd., Kyoeisha Chemical Co., Ltd., etc.

The polyether-modified silicon-containing surfactant has no particular limit. For example, a compound in which the polyalkylene oxide structure represented by the following Chemical structure S-1 is introduced into the side chain of the Si site of dimethyl polysiloxane.

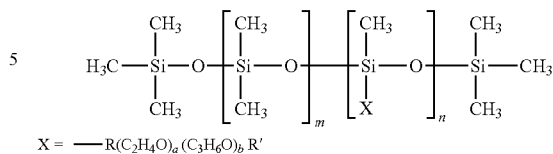

Chemical structure S-1

$X = \text{—}R(C_2H_4O)_a(C_3H_6O)_b R'$

In the Chemical structure S-1, "m", "n", "a", and "b" each, respectively represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NINON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorosurfactant in which the number of carbon atoms replaced with fluorine atoms is from 2 to 16 is preferable and, 4 to 16, more preferable.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

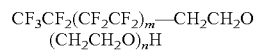

Chemical formula F-1

In the Chemical formula F-1, "m" is preferably 0 or an integer of from 1 to 10 and "n" is preferably 0 or an integer of from 1 to 40 to impart water solubility.

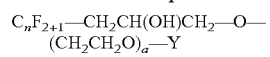

Chemical formula F-2

In the Chemical formula F-2, Y represents H, $C_nF_{2n+1}$, where "n" is an integer of from 1 to 6, $H_2CH(OH)CH$—$C_nF_{2n+1}$, where n represents an integer of from 4 to 6, or $C_pH_{2p+1}$, where p represents an integer of from 1 to 19. "a" represents an integer of from 4 to 14.

Products available on the market may be used as the fluorosurfactant.

Specific examples of the products available on the market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL™ TBS, FSP, FSA, FSN-100, FSN, FSO-100, FSO, FS-300, UR, CAPSTONE® FS-30, FS-31, FS-3100, FS-34, FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N (manufactured by DAIKIN INDUSTRIES). Of these, FT-110, FT-250, FT-251, FT-400S, FT-150, and FT-400SW (all manufactured by The Chemours Company), PolyFox PF-151N (manufactured by OMNOVA SOLUTIONS INC.), and UNIDYNE DSN-403N (manufactured by DAIKIN INDUSTRIES) are particularly preferable in terms of good printing quality, coloring in particular, and improvement on permeation, wettability, and uniform dying property to paper.

The proportion of the surfactant in ink is not particularly limited. It is preferably from 0.001 to 5 percent by mass and more preferably from 0.05 to 5 percent by mass ink in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable to easily break foams.

Preservatives and Fungicides

The preservatives and fungicides are not particularly limited. A specific example is 1,2-benzisothiazoline-3-on.

Corrosion Inhibitor

The corrosion inhibitor has not particular limit. Examples thereof are acid sulfite and sodium thiosulfate.

pH Regulator

The pH regulator has no particular limit. It is preferable to adjust the pH to 7 or higher. Specific examples thereof include, but are not limited to, amines such as diethanol amine and triethanol amine.

The property of the ink is not particularly limited. For example, viscosity, surface tension, pH, etc, are preferably in the following ranges.

The viscosity of the ink at 25 degrees C. is preferably from 5 to 30 mPa·s and more preferably from 5 mPa·s to 25 mPa·s to improve print density and text quality and obtain good dischargeability. The viscosity can be measured by, for example, a rotatory viscometer (RE-80L, manufactured by TOKI SANGYO CO LTD.). The measuring conditions are as follows:

Standard cone rotor (1° 34'×R24)
Sample liquid amount: 1.2 mL
Number of rotations: 50 rotations per minute (rpm) degrees C.
Measuring time: three minutes The surface tension of the ink is preferably 35 mN/m or less and more preferably 32 mN/m or less at 25 degrees C. in terms that the ink is suitably levelized on a print medium and the drying time of the ink is shortened.

The pH of the ink is preferably from 7 to 12 and more preferably from 8 to 11 in terms of prevention of corrosion of metal materials contacting the ink.

Pre-Processing Fluid

The pre-processing fluid contains a flocculant, an organic solvent, water, and optional materials such as a surfactant, a defoaming agent, a pH regulator, a preservatives and fungicides and a corrosion inhibitor.

The organic solvent, the surfactant, the defoaming agent, the pH regulator, the preservatives and fungicides, and the corrosion inhibitor can be the same material as those for use in the ink.

Also, other materials for use in known processing fluid can be used.

The type of the flocculant is not particularly limited. For example, water-soluble cationic polymers, acids, and multi-valent metal salts are suitable.

Post-Processing Fluid

The post-processing fluid has no particular limit. It is preferable that the post-processing fluid can form a transparent layer.

Materials such as organic solvents, water, resins, surfactants, defoaming agents, pH regulators, preservatives and fungicides, corrosion inhibitors, etc. are suitably selected based on a necessity basis and mixed to obtain the post-processing fluid.

The post-processing fluid can be applied to the entire printing area on a print medium or only the printed area.

Print Medium

The print medium for use in printing is not particularly limited. Specific examples thereof include, but are not limited to, plain paper, gloss paper, special paper, cloth, film, transparent sheets, printing paper for general purpose.

Print Medium

The print medium for use in printing is not particularly limited. Plain paper, gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. To be more quantitative, the substrate has a water-absorption amount of 10 mL/m$^2$ or less between the contact and 30 msec$^{1/2}$ after the contact according to Bristow method.

For example, plastic films of polyvinyl chloride resin, polyethylene terephthalate (PET), polypropylene, polyethylene, and polycarbonate are suitably used for the non-permeating substrate.

Printed Matter

The printed matter of the present disclosure includes a print medium and an image formed on the print medium with the ink of the present disclosure.

An inkjet printing device and an inkjet printing method are used to print the image on the print medium to obtain the printed matter.

Printing Device and Printing Method

The ink of the present disclosure can be suitably applied to various printing devices employing an inkjet printing method such as printers, facsimile machines, photocopiers, multifunction peripherals (serving as a printer, a facsimile machine, and a photocopier), and 3D model manufacturing devices (3D printers, additive manufacturing device).

In the present disclosure, the printing device and the printing method represent a device capable of discharging ink, various processing fluids, etc. to a print medium and a method printing an image on the print medium using the device. The print medium means an article to which the ink or the various processing fluids can be attached at least temporarily.

The printing device may further optionally include a device relating to feeding, transferring, and ejecting the print medium and other devices referred to as a pre-processing device, a post-processing device, etc. in addition to the head portion to discharge the ink.

The printing device and the printing method may further optionally include a heater for use in the heating process and a drier for use in the drying process. For example, the heating device and the drying device heat and dry the top surface and the bottom surface of a print medium having an image. The heating device and the drying device are not particularly limited. For example, a fan heater and an infra-red heater can be used. The print medium can be heated and dried before, during, and after printing.

In addition, the printing device and the printing method are not limited to those producing merely meaningful visible images such as texts and figures with the ink. For example, the printing device and the printing method can produce patterns like geometric design and 3D images.

In addition, the printing device includes both a serial type device in which the liquid discharging head is caused to move and a line type device in which the liquid discharging head is not moved, unless otherwise specified.

Furthermore, in addition to the desktop type, this printing device includes a wide type capable of printing images on a large print medium such as A0, a continuous printer capable of using continuous paper wound up in a roll form as print media.

Figure 2:
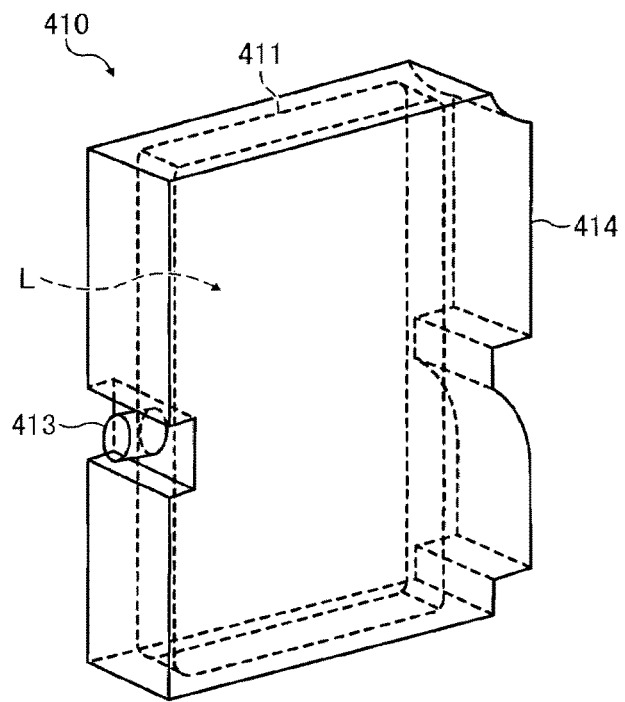
FIG. 2 is a perspective view of the main tank accommodating the ink set of the present disclosure.

The printing device of the present disclosure is described using an example with reference to FIG. 1 and FIG. 2. FIG. 1 is a perspective view illustrating the image printing device. FIG. 2 is a perspective view illustrating the main tank. An image forming apparatus 400 as an example of the printing device is a serial type image forming apparatus. A mechanical unit 420 is disposed in an exterior 401 of the image forming apparatus 400.

Each ink accommodating unit (ink container) 411 of each main tank 410 (410k, 410c, 410m, and 410y) for each color of black (K), cyan (C), magenta (M), and yellow (Y) is made of a packing member such as aluminum laminate film. In this case, for example, black ink corresponds to the ink A and one of cyan, magenta, and yellow ink corresponds to the ink B. The ink container 411 is, for example, accommodated in a plastic housing unit 414. As a result, the main tank 410 is used as an ink cartridge of each color.

A cartridge holder 404 is disposed on the rear side of the opening when a cover 401c is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

This printing device includes may include not only a portion discharging ink but also a device referred to as a pre-processing device, a post-processing device, etc.

As an example of the pre-processing device and the post-processing device, as in the case of the ink such as black (K), cyan (C), magenta (M), and yellow (Y), a liquid container containing a pre-processing fluid or a post-processing fluid and a liquid discharging head are added to discharge the pre-processing fluid or the post-processing fluid in an inkjet printing method.

As another example of the pre-processing device and the post-processing device, it is suitable to dispose a pre-processing device and a post-processing device employing a blade coating method, a roll coating method, or a spray coating method other than the inkjet printing method.

How to use the ink is not limited to the inkjet printing method.

Specific examples of such methods other than the inkjet printing method include, but are not limited to, blade coating methods, gravure coating methods, bar coating methods, roll coating methods, knife coating methods, dip coating methods, die coating methods, and spray coating methods.

The applications of the ink of the present disclosure are not particularly limited. For example, the ink can be used for printed matter, a paint, a coating material, and foundation. The ink can be used to form two-dimensional texts and images and furthermore a three-dimensional solid object (3D modeling object) as a material for 3D modeling.

The apparatus for fabricating a three-dimensional object can be any known device with no particular limit. For example, the apparatus includes an ink container, a supplying device, and a discharging device, a drier, etc.

The three-dimensional solid object includes an object manufactured by re-applying ink.

In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc.

The molded processed product is suitable for what is molded after surface-decorating. Examples thereof are gauges or operation panels of vehicles, office machines, electric and electronic machines, cameras, etc.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Bk, C, M, and Y respectively represent black, cyan, magenta, and yellow in the following description.

Preparation of Compositions Constituting Ink for Inkjet Recording

Preparation Example 1

Preparation of Liquid Dispersion of Self-Dispersible Black Pigment 100 g of Black Pearls® 1000 (carbon black having a BET specific surface area of 343 $m^2/g$ and a DBPA of 105 ml/100 g, manufactured by Cabot Corporation), 100 milimole of sulfanilic acid, and 1 liter of deionized highly deionized water were mixed by a Silverson Mixer at 6,000 rpm in room temperature environment. If the thus-obtained slurry has a pH higher than 4, 100 mmol of nitric acid is added thereto. 30 minutes later, 100 mmol of sodium nitrite dissolved in a minute amount of deionized highly deionized water was slowly added to the mixture. Furthermore, the temperature was raised to 60 degrees C. under stirring to conduct reaction for one hour. A reformed pigment in which sulfanilic acid was added to carbon black was manufactured. Next, pH of the reformed pigment was adjusted to 9 with 10 percent tetrabutyl ammonium hydroxide solution (methanol solution). 30 minutes later, a reformed pigment dispersion was obtained. The dispersion containing a pigment bonding with at least one sulfanilic acid group or a sulfanilic acid tetrabutyl ammonium salt and deionized highly deionized water were subject to ultra-filtration through dialysis membrane. Moreover, subsequent to ultrasonic dispersion, a reformed pigment dispersion in which the pigment solid portion was condensed to 20 percent was obtained. The surface treatment level was 0.75 milimole/g and the volume average particle diameter (D50) as measured by a particle size distribution measuring instrument (NANOTRAC LTPA-EX150, manufactured by NIKKISO CO., LTD.) was 131 nm.

Preparation Example 2

Preparation of Liquid Dispersion of Self-Dispersible Cyan Pigment 1 kg of SMART Cyan 3154BA (Pigment Blue 15:4 surface-treated dispersion, Solid portion: 14.5%, manufactured by SENSIENT Corporation) was acid-deposited with 0.1 N HCL aqueous solution. Next, pH of the resultant was adjusted to 9 with 40 percent benzyl trimethyl ammonium hydroxide solution (methanol solution). 30 minutes later, a reformed pigment dispersion was obtained. The thus-obtained reformed pigment dispersion including a pigment bonded to at least one amino benzoate group or amino benzoate benzyltrimethyl ammonium salt and deionized highly deionized water were subject to ultrafiltration by dialysis membrane, followed by ultrasonic dispersion to obtain a reformed pigment dispersion in which the pigment solid portion was condensed to 20 percent. In addition, the volume average particle diameter (D50) of the reformed pigment dispersion was 92 nm as measured by a particle size distribution measuring instrument (NANOTRAC UPA-EX150, manufactured by NIKKISO CO., LTD.).

Preparation Example 3

Preparation of Liquid Dispersion of Resin-Coated Black Pigment

Preparation of Polymer Solution A

After sufficient replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol were mixed and the system was heated to 65 degrees C. Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobismethyl valeronitrile, and 18 g of methylethyl ketone was dripped into the flask in two and a half hours. Subsequently, a liquid mixture of 0.8 g of azobismethyl valeronitrile and 18 g of methylethyl ketone was dripped into the flask in half an hour. After one-hour aging at 65 degrees C., 0.8 g of azobismethyl valeronitrile was added and aged for another hour. After the reaction was complete, 364 g of methylethyl ketone was added to the flask to obtain 800 g of polymer solution A having a concentration of 50 percent by mass.

Preparation of Dispersion of Polymer Particulate Containing Carbon Black Pigment After sufficiently stirring 28 g of the polymer solution A, 42 g of C.I. carbon black (FW100, manufactured by Degussa AG), 13.6 g of 1 mol/l potassium hydroxide solution, 20 g of methylethyl ketone, and 13.6 g of deionized water, the mixture was mixed and kneaded by a roll mill. The thus-obtained paste was charged in 200 g of deionized water followed by sufficient stirring. Methylethyl ketone and water were distilled away from the resultant using an evaporator. To remove coarse particles, the thus-obtained liquid dispersion was filtrated with an increased pressure with a polyvinylidene fluoride membrane filter having an average aperture diameter of 5.0 μm to obtain a liquid dispersion of polymer particulate containing carbon black pigment having a solid pigment portion in an amount of 15 percent by mass with a solid portion concentration of 20 percent by mass.

The volume average particle diameter (D50) of the polymer particulates in the liquid dispersion of polymer particulate containing carbon black pigment was 104 nm as measured by particle size distribution measuring instrument (NANOTRAC UPA-EX150, manufactured by NIKKISO CO., LTD.)

Preparation Example 4

Preparation of Liquid Dispersion of Resin-Coated Cyan Pigment

A liquid dispersion of resin-coated cyan pigment was obtained in the same manner as in the Preparation Example 3 except that the carbon black pigment in Preparation Example 3 was replaced with Pigment Blue 15:3. The thus-obtained liquid dispersion of resin-coated cyan pigment had a pigment solid portion of 15 percent by mass and a solid portion concentration of 20 percent by mass. The volume average particle diameter (D50) of the resin-coated pigment in the liquid dispersion of resin-coated cyan pigment was 89 nm as measured by particle size distribution measuring instrument (NANOTRAC UPA-EX150, manufactured by NIKKISO CO., LTD.).

Preparation Example 5

Preparation of Liquid Dispersion of Resin-Coated Magenta Pigment

A liquid dispersion of resin-coated magenta pigment was obtained in the same manner as in the Preparation Example 3 except that the carbon black pigment in Preparation Example 3 was replaced with Pigment Red 122. The thus-obtained liquid dispersion of resin-coated magenta pigment had a pigment solid portion of 15 percent by mass and a solid portion concentration of 20 percent by mass. The volume average particle diameter (D50) of the resin-coated pigment in the liquid dispersion of resin-coated magenta pigment was 90 nm as measured by particle size distribution measuring instrument (NANOTRAC UPA-EX150, manufactured by NIKKISO CO., LTD.).

Preparation Example 6

Preparation of Liquid Dispersion of Resin-Coated Yellow Pigment

A liquid dispersion of resin-coated yellow pigment was obtained in the same manner as in the Preparation Example 3 except that the carbon black pigment in Preparation Example 3 was replaced with Pigment Yellow 74. The thus-obtained liquid dispersion of resin-coated yellow pigment had a pigment solid portion of 15 percent by mass and a solid portion concentration of 20 percent by mass. The volume average particle diameter (D50) of the resin-coated pigment in the liquid dispersion of resin-coated yellow pigment was 49 nm as measured by particle size distribution measuring instrument (NANOTRAC UPA-EX150, manufactured by NIKKISO CO., LTD.).

Preparation Example 7

Preparation of Liquid Dispersion of Surfactant Dispersing Black Pigment

| | |
|---|---|
| Carbon black (NIPEX 150-IQ, manufactured by Degussa AG): | 200 parts |

-continued

| Preparation of Liquid Dispersion of Surfactant Dispersing Black Pigment | |
|---|---|
| Polyoxyethylene (n = 40) β-naphtyl ether: (Nonionic dispersant represented by the following Chemical structure 1 when l = 0 and n = 40) | 50 parts |
| Distilled water: | 750 parts |

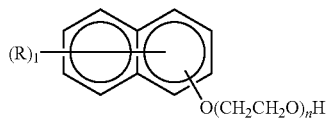

Chemical structure 1

The mixture specified above was premixed and dispersed by a bead mill dispersion machine (UAM-015, manufactured by Kotobuki Industries Co., ltd.) using zirconia beads having a diameter of 0.3 mm) at a peripheral speed of 10 m/s at a liquid temperature of 30 degrees C. for 15 minutes. Thereafter, the resultant was subject to centrifugal separation for coarse particles by a centrifugal (Model-3600, manufactured by KUBOTA Corporation) to obtain a black pigment dispersion D having a pigment solid portion of 15 percent by mass.

The volume average particle diameter (D50) of the surfactant dispersing pigment in the liquid dispersion of surfactant dispersing black pigment was 102 nm as measured by particle size distribution measuring instrument (NANOTRAC UPA-EX150, manufactured by NIKKISO CO., LTD.).

Preparation Example 8

Liquid Dispersion of Surfactant Dispersing Cyan Pigment

A liquid dispersion of surfactant dispersing cyan pigment was obtained in the same manner as in the Preparation Example 7 except that the carbon black pigment in Preparation Example 7 was replaced with Pigment Blue 15:3. The average particle diameter (D50) of the surfactant dispersing pigment in the liquid dispersion of surfactant dispersing cyan pigment was 86 nm as measured by particle size distribution measuring instrument (NANOTRAC UPA-EX150, manufactured by NIKKISO CO., LTD.).

Preparation Example 9

Preparation of Aqueous Dispersion 1 of Polycarbonate-Based Anionic Urethane Resin 287.9 parts of crystalline polycarbonate diol (DURANOL™ T6002, manufactured by Asahi Kasei Corporation) having an Mn of 2,000, 3.6 parts of 1,4-butane diol, 8.9 parts of DMPA, 98.3 parts of hydrogenated MDI, and 326.2 parts of acetone were charged in a simple pressurizing reactor equipped with a stirrer and a heater while introducing nitrogen. Thereafter, the system was heated to 90 degrees C. to conduct urethanification reaction in 8 hours to manufacture a prepolymer.

The reaction mixture was cooled down to 40 degrees C., 6.8 parts of triethylamine was admixed and moreover, 568.8 parts of water was added. The resultant was emulsified by a mechanical emulsifier of a rotor-stator system to obtain an aqueous dispersion.

28.1 parts of 10 percent ethylene diamine aqueous solution was added to the thus-obtained aqueous dispersion under stirring. The system was stirred at 50 degrees C. for five hours to conduct chain elongation reaction.

Thereafter, acetone was removed at 65 degrees C. with a reduced pressure. Thereafter, the moisture was controlled to obtain an aqueous dispersion 1 of polycarbonate-based anionic urethane resin having a solid portion of 40 percent by mass. The volume average particle diameter (D50) of the aqueous dispersion 1 of polycarbonate-based anionic urethane resin was 42 nm as measured by a particle size distribution measuring instrument (NANOTRAC UPA-EX150, manufactured by NIKKISO CO., LTD.).

Preparation Example 10

Preparation of Aqueous Dispersion 2 of Polycarbonate-Based Anionic Urethane Resin An aqueous dispersion 2 of polycarbonate-based anionic urethane resin was obtained in the same manner as in Preparation Example 4 except that the addition amount of triethylamine was changed to 1.5 parts. The volume average particle diameter (D50) of the aqueous dispersion 2 of polycarbonate-based anionic urethane resin was 187 nm as measured by a particle size distribution measuring instrument (NANOTRAC UPA-EX150, manufactured by NIKKISO CO., LTD.).

Preparation Example 11

Preparation of Aqueous Dispersion 3 of Polycarbonate-Based Anionic Urethane Resin An aqueous dispersion 3 of polycarbonate-based anionic urethane resin was obtained in the same manner as in Preparation Example 4 except that the addition amount of triethylamine was changed to 2.5 parts. The volume average particle diameter (D50) of the aqueous dispersion 3 of polycarbonate-based anionic urethane resin was 123 nm as measured by a particle size distribution measuring instrument (NANOTRAC UPA-EX150, manufactured by NIKKISO CO., LTD.).

Preparation Example 12

Preparation of Aqueous Dispersion 4 of Polycarbonate-Based Anionic Urethane Resin An aqueous dispersion 4 of polycarbonate-based anionic urethane resin was obtained in the same manner as in Preparation Example 4 except that the addition amount of triethylamine was changed to 4.9 parts. The volume average particle diameter (D50) of the aqueous dispersion 4 of polycarbonate-based anionic urethane resin was 79 nm as measured by a particle size distribution measuring instrument (NANOTRAC UPA-EX150, manufactured by NIKKISO CO., LTD.).

Preparation Example 13

Preparation of Aqueous Dispersion 5 of Polycarbonate-Based Anionic Urethane Resin An aqueous dispersion 5 of polycarbonate-based anionic urethane resin was obtained in the same manner as in Preparation Example 4 except that the addition amount of triethylamine was changed to 10.0 parts. The volume average particle diameter (D50) of the aqueous dispersion 5 of polycarbonate-based anionic urethane resin was 14 nm as measured by a particle size distribution measuring instrument (NANOTRAC UPA-EX150, manufactured by NIKKISO CO., LTD.).

Preparation Example 14

Preparation of Aqueous Dispersion of Acrylic-Silicone Resin

After sufficient replacement with nitrogen gas in a flask equipped with a mechanical stirrer, a thermometer, a nitrogen gas introducing tube, a reflux tube, and a dripping funnel, 17.5 g of LATEMUL S-180 (reactive anionic surfactant, manufactured by Kao Corporation) was admixed with 350 g of deionized water and heated to 65 degrees C.

Subsequent to the heating, 3.0 g of t-butylperoxy benzoate serving as a reaction initiator and 1.0 g of sodium isoascorbiate were added to the mixture and five minutes later, a mixture of 45 g of methylmethacrylate, 160 g of methacrylic acid-2-ethylhexyl, 5 g of acrylic acid, 45 g of butylmethacrylate, 30 g of cyclohexyl methacrylate, 15 g of vinyltriethoxysilane, 8.0 g of LATEMUL S-180, and 340 g of deionized water were dripped to the resultant in three hours. Thereafter, the system was aged at 80 degrees C. for two-hours and cooled down to room temperature. pH of the resultant was adjusted to 7-8 by sodium hydroxide.

Thereafter, ethanol was distilled away by an evaporator followed by moisture control to obtain 730 g of an aqueous dispersion 1 of acrylic-silicone resin having a solid portion of percent by mass. The volume average particle diameter (D50) of the aqueous dispersion 1 of acrylic-silicone resin was 43 nm as measured by a particle size distribution measuring instrument (NANOTRAC UPA-EX150, manufactured by NIKKISO CO., LTD.).

Preparation of Ink for Inkjet Recording

Ink 1

0.1 parts of dimethyl ethanolamine, 20 parts of 1,3-butane diol, 10 parts of 3-methyl-1,3-butane diol, 8 parts of glycerin, 2 parts of 2-ethyl-1,3-hexanediol, and 0.01 parts of a surfactant were placed in a container equipped with a stirrer followed by stirring for about 30 minutes for unification. Next, 8.0 parts of the pigment solid portion of the liquid dispersion of self-dispersible black pigment (Preparation Example 1) and highly deionized water were added thereto and stirred for about 60 minutes for unification. Furthermore, 3 parts of the resin solid portion of aqueous dispersion of polycarbonate-based anionic urethane resin (Preparation Example 9) was added thereto and stirred for 30 minutes to obtain uniform ink. The ink was filtrated under an increased pressure by using a polyvinilydene fluoride membrane filter having an average aperture diameter of 1.2 μm to remove coarse particles and dust to manufacture ink 1 for ink for inkjet recording.

Ink 2-26

As in the manner to manufacture the ink 1, the aqueous organic solvents and surfactants shown in Tables 1 and 2 were mixed and stirred, the water-dispersible coloring materials (pigment dispersion) and highly deionized water were admixed and stirred, and the water-dispersible resins were mixed and stirred to obtain uniform ink. This ink for inkjet recording was filtrated under an increased pressure by using a polyvinilydene fluoride membrane filter having an average aperture diameter of 1.2 μm to remove coarse particles and dust to manufacture each of ink 2-26 as ink for inkjet recording.

Next, Tables 1 and 2 are described.

The values in Tables 1 and 2 are represented in parts by mass.

However, the values for the liquid dispersion of pigment are represented in parts by mass of pigment solid portion. The values for aqueous dispersion of resin are represented in parts by mass of the resin solid portion.

TAKELAC™ W5661 (manufactured by Mitsui Chemicals, Inc.) having a particle diameter (D50) of 15.4 nm was used as the polyether-based anionic urethane resin.

UWS-145 (manufactured by Sanyo Chemical Industries, Ltd.) having a particle diameter (D5) of 17 nm was used as the polyester-based anionic urethane resin.

TABLE 1

| | | Resin particle D50 (nm) | Boiling point (degrees C.) | Amine compound Molecular mass | Ink No. 1 | 2 | 3 | 4 | 5 | 6 | 7 |
|---|---|---|---|---|---|---|---|---|---|---|---|
| Dispersion | Liquid dispersion of self-dispersible black pigment (Preparation Example 1) | | | | 8.0 | — | — | — | — | — | — |
| | Liquid dispersion of self-dispersible cyan pigment (Preparation Example 2) | | | | — | 3.0 | — | — | — | — | — |
| | Liquid dispersion of resin-coated black pigment (Preparation Example 3) | | | | — | — | 6.0 | — | — | — | — |
| | Liquid dispersion of resin-coated cyan pigment (Preparation Example 4) | | | | — | — | — | 4.0 | — | — | — |

TABLE 1-continued

| | | | | | | | | | |
|---|---|---|---|---|---|---|---|---|---|
| | Liquid dispersion of resin-coated magenta pigment (Preparation Example 5) | | | | | | 5.0 | — | — |
| | Liquid dispersion of resin-coated yellow pigment (Preparation Example 6) | | | | | | — | 4.0 | — |
| | Liquid dispersion of surfactant dispersing black pigment (Preparation Example 7) | | | | | | — | — | 7.0 |
| | Liquid dispersion of surfactant dispersing cyan pigment (Preparation Example 8) | | | | | | — | — | — |
| Binder Resin | Aqueous dispersion 1 of polycarbonate-based urethane resin (Preparation Example 9) | 42 | | 3.0 | — | — | — | — | 3.0 |
| | Polyether-based urethane resin (TAKELAC™ W5661) | 15 | | — | — | — | — | — | — |
| | Polyester-based urethane resin (UWS-145) | 17 | | — | 4.0 | — | — | — | — |
| | Aqueous dispersion 2 of polycarbonate-based urethane resin (Preparation Example 10) | 184 | | | | | | | |
| | Aqueous dispersion 3 of polycarbonate-based urethane resin (Preparation Example 11) | 123 | | | | | | | |
| | Aqueous dispersion 4 of polycarbonate-based urethane resin (Preparation Example 12) | 79 | | | | | | | |
| | Aqueous dispersion 5 of polycarbonate-based urethane resin (Preparation Example 13) | 14 | | | | | | | |
| | Aqueous dispersion 1 of acrylic-silicone resin (Preparation Example 14) | 43 | | | | | | | |
| Amine Compound | Diethylamine | 55 | 73 | — | — | — | — | — | — |
| | Triethyl amine | 89 | 101 | — | — | — | — | — | — |
| | Dimethyl ethanol amine | 133 | 89 | 0.1 | 0.04 | — | — | — | 0.2 |

TABLE 1-continued

| | | | | Ink No. | | | | | | |
|---|---|---|---|---|---|---|---|---|---|---|
| | | | | 8 | 9 | 10 | 11 | 12 | 13 | 14 |
| | 2-amino-2-methyl-1-propane | 165 | 89 | — | — | — | — | — | — | — |
| | Piperazine | 144 | 86 | — | — | — | — | — | — | — |
| | 2-amino-2-methyl-1,3-propane diol | 152 | 105 | — | — | — | — | — | — | — |
| Organic solvent | 1,3-butane diol | | | 20.0 | 20.0 | 20.0 | 20.0 | 20.0 | 25.0 | 20.0 |
| | 3-methyl-1,3-butane diol | | | 10.0 | 10.0 | 10.0 | 10.0 | 10.0 | 8.0 | 10.0 |
| | Glycerin | | | 8.0 | — | 8.0 | — | 8.0 | 4.0 | 8.0 |
| | Triethylene glycol | | | — | 8.0 | — | 8.0 | — | — | — |
| | 2-ethyl-1,3-hexanediol | | | 2.0 | — | 2.0 | — | 2.0 | 2.0 | 2.0 |
| | 2,2,4-trimethyl-1,3-pentanediol | | | — | 2.0 | — | 2.0 | — | — | — |
| | Surfactant | | | 0.1 | 0.1 | 0.1 | 0.1 | 0.1 | 0.1 | 0.1 |
| | Water | | | Rest | Rest | Rest | Rest | Rest | Rest | Rest |

| | | Resin particle D50 (nm) | Boiling point (degrees C.) | Amine compound Molecular mass | Ink No. | | | | | | |
|---|---|---|---|---|---|---|---|---|---|---|---|
| | | | | | 8 | 9 | 10 | 11 | 12 | 13 | 14 |
| Dispersion | Liquid dispersion of self-dispersible black pigment (Preparation Example 1) | | | | — | 8.0 | 7.5 | 7.0 | 6.0 | 7.5 | 9.0 |
| | Liquid dispersion of self-dispersible cyan pigment (Preparation Example 2) | | | | — | — | — | — | — | — | — |
| | Liquid dispersion of resin-coated black pigment (Preparation Example 3) | | | | — | — | — | — | — | — | — |
| | Liquid dispersion of resin-coated cyan pigment (Preparation Example 4) | | | | — | — | — | — | — | — | — |
| | Liquid dispersion of resin-coated magenta pigment (Preparation Example 5) | | | | — | — | — | — | — | — | — |
| | Liquid dispersion of resin-coated yellow pigment (Preparation Example 6) | | | | — | — | — | — | — | — | — |
| | Liquid dispersion of surfactant dispersing black pigment (Preparation Example 7) | | | | — | — | — | — | — | — | — |
| | Liquid dispersion of surfactant dispersing cyan pigment (Preparation Example 8) | | | | 5.0 | — | — | — | — | — | — |

TABLE 1-continued

| Category | Component | ID1 | ID2 | 1 | 2 | 3 | 4 | 5 | 6 | 7 |
|---|---|---|---|---|---|---|---|---|---|---|
| Binder Resin | Aqueous dispersion 1 of polycarbonate-based urethane resin (Preparation Example 9) | 42 | | 2.5 | — | — | — | — | — | — |
| | Polyether-based urethane resin (TAKELAC™ W5661) | 15 | | — | 4.0 | — | — | — | — | — |
| | Polyester-based urethane resin (UWS-145) | 17 | | — | — | 5.0 | — | — | — | — |
| | Aqueous dispersion 2 of polycarbonate-based urethane resin (Preparation Example 10) | 184 | | — | — | — | 5.0 | — | — | — |
| | Aqueous dispersion 3 of polycarbonate-based urethane resin (Preparation Example 11) | 123 | | — | — | — | — | 6.0 | — | — |
| | Aqueous dispersion 4 of polycarbonate-based urethane resin (Preparation Example 12) | 79 | | — | — | — | — | — | 4.0 | — |
| | Aqueous dispersion 5 of polycarbonate-based urethane resin (Preparation Example 13) | 14 | | — | — | — | — | — | — | 2.0 |
| | Aqueous dispersion 1 of acrylic-silicone resin (Preparation Example 14) | 43 | | — | — | — | — | — | — | — |
| Amine Compound | Diethylamine | 55 | 73 | — | — | — | — | — | — | — |
| | Triethyl amine | 89 | 101 | — | — | — | — | — | — | — |
| | Dimethyl ethanol amine | 133 | 89 | 0.2 | — | 0.4 | 0.3 | — | — | — |
| | 2-amino-2-methyl-1-propane | 165 | 89 | — | 0.1 | — | — | — | 0.2 | — |
| | Piperazine | 144 | 86 | — | — | — | — | 0.2 | — | 0.1 |
| | 2-amino-2-methyl-1,3-propane diol | 152 | 105 | — | — | — | — | — | — | — |
| Organic solvent | 1,3-butane diol | | | 20.0 | 20.0 | 20.0 | 20.0 | 20.0 | 25.0 | 20.0 |
| | 3-methyl-1,3-butane diol | | | 10.0 | 10.0 | 10.0 | 10.0 | 10.0 | 8.0 | 10.0 |
| | Glycerin | | | 8.0 | — | 8.0 | 8.0 | — | 4.0 | 8.0 |
| | Triethylene glycol | | | — | 8.0 | — | — | 8.0 | — | — |
| | 2-ethyl-1,3-hexanediol | | | — | — | 2.0 | — | — | 2.0 | 2.0 |
| | 2,2,4-trimethyl-1,3-pentanediol | | | 2.0 | 2.0 | — | 2.0 | 2.0 | — | — |
| | Surfactant | | | 0.1 | 0.1 | 0.1 | 0.1 | 0.1 | 0.1 | 0.1 |
| | Water | | | Rest | Rest | Rest | Rest | Rest | Rest | Rest |

TABLE 2

| | | Resin particle D50 (nm) | Boiling point (degrees C.) | Amine compound Molecular mass | Ink No. | | | | | | |
|---|---|---|---|---|---|---|---|---|---|---|---|
| | | | | | 15 | 16 | 17 | 18 | 19 | 20 | 21 |
| Dispersion | Liquid dispersion of self-dispersible black pigment (Preparation Example 1) | | | | 8.0 | 6.0 | 8.5 | 8.0 | 6.0 | 7.0 | 6.0 |
| | Liquid dispersion of self-dispersible cyan pigment (Preparation Example 2) | | | | — | — | — | — | — | — | — |
| | Liquid dispersion of resin-coated black pigment (Preparation Example 3) | | | | — | — | — | — | — | — | — |
| | Liquid dispersion of resin-coated cyan pigment (Preparation Example 4) | | | | — | — | — | — | — | — | — |
| | Liquid dispersion of resin-coated magenta pigment (Preparation Example 5) | | | | — | — | — | — | — | — | — |
| | Liquid dispersion of resin-coated yellow pigment (Preparation Example 6) | | | | — | — | — | — | — | — | — |
| | Liquid dispersion of surfactant dispersing black pigment (Preparation Example 7) | | | | — | — | — | — | — | — | — |
| | Liquid dispersion of surfactant dispersing cyan pigment (Preparation Example 8) | | | | — | — | — | — | — | — | — |
| Binder Resin | Aqueous dispersion 1 of polycarbonate-based urethane resin (Preparation Example 9) | 42 | | | — | 4.0 | — | 3.5 | 4.0 | — | — |
| | Polyether-based urethane resin (TAKELAC™ W5661) | 15 | | | — | — | — | — | — | — | — |
| | Polyester-based urethane resin (UWS-145) | 17 | | | — | — | 3.0 | — | — | 3.0 | 2.0 |
| | Aqueous dispersion 2 of polycarbonate-based urethane resin (Preparation Example 10) | 184 | | | — | — | — | — | — | — | — |

TABLE 2-continued

|  |  | Resin particle D50 (nm) | Boiling point (degrees C.) | Amine compound Molecular mass | Ink No. 15 | 16 | 17 | 18 | 19 | 20 | 21 |
|---|---|---|---|---|---|---|---|---|---|---|---|
|  | Aqueous dispersion 3 of polycarbonate-based urethane resin (Preparation Example 11) | 123 |  |  | — | — | — | — | — | — | — |
|  | Aqueous dispersion 4 of polycarbonate-based urethane resin (Preparation Example 12) | 79 |  |  | — | — | — | — | — | — | — |
|  | Aqueous dispersion 5 of polycarbonate-based urethane resin (Preparation Example 13) | 14 |  |  | — | — | — | — | — | — | — |
|  | Aqueous dispersion 1 of acrylic-silicone resin (Preparation Example 14) | 43 |  |  | 3.5 | — | — | — | — | — | — |
| Amine Compound | Diethyl amine |  | 55 | 73 | — | 0.1 | — | — | — | — | — |
|  | Triethyl amine |  | 89 | 101 | — | — | 0.2 | — | — | — | — |
|  | Dimethyl ethanol amine |  | 133 | 89 | 0.1 | — | — | — | — | — | — |
|  | 2-amino-2-methyl-1-propanol |  | 165 | 89 | — | — | — | 0.1 | — | — | 0.03 |
|  | Piperazine |  | 144 | 86 | — | — | — | — | 0.2 | — | — |
|  | 2-amino-2-methyl-1,3-propane diol |  | 152 | 119 | — | — | — | — | — | 0.2 | — |
| Organic solvent | 1,3-butane diol |  |  |  | 20.0 | 20.0 | 20.0 | 25.0 | 20.0 | 20.0 | 20.0 |
|  | 3-methyl-1,3-butane diol |  |  |  | 10.0 | 10.0 | 10.0 | 8.0 | 10.0 | 10.0 | 10.0 |
|  | Glycerin |  |  |  | — | — | 8.0 | 4.0 | 8.0 | 8.0 | — |
|  | Triethylene glycol |  |  |  | 8.0 | 8.0 | — | — | — | — | 8.0 |
|  | 2-ethyl-1,3-hexanediol |  |  |  | — | — | 2.0 | 2.0 | 2.0 | — | — |
|  | 2,2,4-trimethyl-1,3-pentanediol |  |  |  | 2.0 | 2.0 | — | — | — | 2.0 | 2.0 |
|  | Surfactant |  |  |  | 0.1 | 0.1 | 0.1 | 0.1 | 0.1 | 0.1 | 0.1 |
|  | Water |  |  |  | Rest | Rest | Rest | Rest | Rest | Rest | Rest |

|  |  | Resin particle D50 (nm) | Boiling point (degrees C.) | Amine compound Molecular mass | Ink No. 22 | 23 | 24 | 25 | 26 |
|---|---|---|---|---|---|---|---|---|---|
| Dispersion | Liquid dispersion of Self-Dispersible black pigment (Preparation Example 1) |  |  |  | 6.0 | 5.0 | — | — | — |
|  | Liquid dispersion of Self-Dispersible cyan pigment (Preparation Example 2) |  |  |  | — | — | — | — | — |
|  | Liquid dispersion of resin-coated black pigment (Preparation Example 3) |  |  |  | — | — | — | — | — |

TABLE 2-continued

|  |  |  |  |  |  |  |  |
|---|---|---|---|---|---|---|---|
|  | Liquid dispersion of resin-coated cyan pigment (Preparation Example 4) |  |  | — | — | 5.0 | 3.5 | — |
|  | Liquid dispersion of resin-coated magenta pigment (Preparation Example 5) |  |  | — | — | — | — | 8.5 |
|  | Liquid dispersion of resin-coated yellow pigment (Preparation Example 6) |  |  | — | — | — | — | — |
|  | Liquid dispersion of surfactant dispersing black pigment (Preparation Example 7) |  |  | — | — | — | — | — |
|  | Liquid dispersion of surfactant dispersing cyan pigment (Preparation Example 8) |  |  | — | — | — | — | — |
| Binder Resin | Aqueous dispersion 1 of polycarbonate-based urethane resin (Preparation Example 9) | 42 |  | 4.0 | 3.0 | — | — | — |
|  | Polyether-based urethane resin (TAKELAC ™ W5661) | 15 |  | — | — | — | — | — |
|  | Polyester-based urethane resin (UWS-145) | 17 |  | — | — | — | — | — |
|  | Aqueous dispersion 2 of polycarbonate-based urethane resin (Preparation Example 10) | 184 |  | — | — | — | — | — |
|  | Aqueous dispersion 3 of polycarbonate-based urethane resin (Preparation Example 11) | 123 |  | — | — | — | — | — |
|  | Aqueous dispersion 4 of polycarbonate-based urethane resin (Preparation Example 12) | 79 |  | — | — | — | — | — |
|  | Aqueous dispersion 5 of polycarbonate-based urethane resin (Preparation Example 13) | 14 |  | — | — | — | — | — |

TABLE 2-continued

|  |  |  |  |  |  |  |  |  |
|---|---|---|---|---|---|---|---|---|
|  | Aqueous dispersion 1 of acrylic-silicone resin (Preparation Example 14) | 43 | — | — | — | — | — | — |
| Amine Compound | Diethyl amine | 55 | 73 | — | — | — | — | — |
|  | Triethyl amine | 89 | 101 | — | — | — | — | — |
|  | Dimethyl ethanol amine | 133 | 89 | — | — | — | — | — |
|  | 2-amino-2-methyl-1-propanol | 165 | 89 | 5.1 | 0.02 | — | — | — |
|  | Piperazine | 144 | 86 | — | — | — | — | — |
|  | 2-amino-2-methyl-1,3-propane diol | 152 | 119 | — | — | — | — | — |
| Organic solvent | 1,3-butane diol |  |  | 20.0 | 20.0 | 20.0 | 20.0 | 25.0 |
|  | 3-methyl-1,3-butane diol |  |  | 10.0 | 10.0 | 10.0 | 10.0 | 8.0 |
|  | Glycerin |  |  | 8.0 | 8.0 | — | — | 4.0 |
|  | Triethylene glycol |  |  | — | — | 8.0 | 8.0 | — |
|  | 2-ethyl-1,3-hexanediol |  |  | 2.0 | — | — | — | 2.0 |
|  | 2,2,4-trimethyl-1,3-pentanediol |  |  | — | 2.0 | 2.0 | 2.0 | — |
|  | Surfactant |  |  | 0.1 | 0.1 | 0.1 | 0.1 | 0.1 |
|  | Water |  |  | Rest | Rest | Rest | Rest | Rest |

Evaluation on Ink Properties

Ink properties for ink for inkjet recording of each of ink 1-26 were measured according to the following evaluation method. The results are shown in Table 3.

Measuring of Ink Viscosity

Viscosity of the ink was measured by a viscometer (RE-550L, manufactured by TOKI SANGYO CO., LTD.) at 25 degrees C.

Measuring of pH of Ink pH of the ink was measured at 25 degrees C. using a pH meter (HM-30R type, manufactured by DKK-TOA CORPORATION).

Particle Diameter (D50)

The volume average particle diameter (D50) of the pigment was measured by using a particle size distribution measuring instrument (NANOTRAC UPA-EX150, manufactured by NIKKISO CO., LTD.) in such a manner that the solid portion concentration was 0.01 percent by mass.

Storage Stability of Ink

Each ink was put in a polyethylene container and the container was sealed. After storing the ink at 70 degrees C. for two weeks, the volume average particle diameter (D50) and viscosity were measured. The ink was evaluated by the variation between before and after the storage according to the following criteria.

G (Good): 5 percent or less
M (Marginal): less than 10 percent
P (Poor): Not less than 10 percent

TABLE 3

| Ink No. | Ink Properties | | | |
|---|---|---|---|---|
|  | Viscosity (mPa · s) | pH | Particle diameter (D50) (nm) | Storage Stability |
| Ink 1 | 8.3 | 9.8 | 131 | G |
| Ink 2 | 7.5 | 9.6 | 72 | G |
| Ink 3 | 7.8 | 9.3 | 101 | M |
| Ink 4 | 7.6 | 9.2 | 76 | M |
| Ink 5 | 8.1 | 9.3 | 91 | M |
| Ink 6 | 7.5 | 9.5 | 52 | M |
| Ink 7 | 8.3 | 9.7 | 112 | M |
| Ink 8 | 8.1 | 9.8 | 82 | P |
| Ink 9 | 8.2 | 9.7 | 131 | G |
| Ink 10 | 8.4 | 10.2 | 135 | G |
| Ink 11 | 7.8 | 10.1 | 134 | G |
| Ink 12 | 8.3 | 9.9 | 140 | G |
| Ink 13 | 7.9 | 10.0 | 142 | G |
| Ink 14 | 8.2 | 9.7 | 115 | M |
| Ink 15 | 7.8 | 9.9 | 135 | M |
| Ink 16 | 7.9 | 10.3 | 129 | M |
| Ink 17 | 7.8 | 10.2 | 138 | G |
| Ink 18 | 8.0 | 9.7 | 132 | G |
| Ink 19 | 8.5 | 9.9 | 131 | G |
| Ink 20 | 7.8 | 10.2 | 133 | M |
| Ink 21 | 8.1 | 10.1 | 135 | G |
| Ink 22 | 7.6 | 10.1 | 129 | G |
| Ink 23 | 8.0 | 9.4 | 128 | M |
| Ink 24 | 7.9 | 10.6 | 131 | M |
| Ink 25 | 8.0 | 9.2 | 135 | P |
| Ink 26 | 7.6 | 9.5 | 72 | G |

Examples 1-15 and Comparative Examples 1-8

Ink 1-25 were used in combination as shown in Table 4 to obtain ink sets for ink for inkjet recording of Examples 1-15 and Comparative Examples 1-8.

Next, images were formed according to the following image forming process using each ink set. Each ink set for ink for inkjet recording of Examples 1-15 and Comparative Examples 1-8 by the following evaluation method. The results are shown in Table 4.

Of the Ink A and the Ink B, the combination of the Ink A and the Ink B of the present disclosure is the ink A including water, the organic solvent A, the self-dispersible pigment, and the anionic resin particle and the amine compound having a boiling point of 120 degrees C.-200 degrees C. and the ink B in which the content of the resin-coated pigment is 10-200 when the ink B is used in combination with the Ink A.

Image Forming Process

In an environment in which the temperature and moisture were controlled within the range of 22.5 degrees C.-23.5 degrees C. and 45 percent RH-55 percent RH, using an inkjet printer (IPSiO GXe-5500, manufactured by RICOH CO., LTD.), the drive voltage of piezoelectric element was changed to set the discharging amount of the ink equal so that the same amount of the ink was attached to recording (print) media. Next, images were formed in the print mode of the inkjet recording device set to [Plain paper fast] and [Gloss paper fast].

Abrasion Resistance

A solid image chart of 3 cm×3 cm was printed on Poster Paper MAX (manufactured by SAKURAI CO., LTD., weight: 180 g/m$^2$) was printed in the gloss paper and fast mode using the printer mentioned above.

After drying the image, the printed portion was abraded with cotton cloth five times (back and forth each time). Image peeling-off of the printed portion was visually observed and abrasion resistance was evaluated. The results were evaluated according to the following criteria.

For the color mixed portion of the Ink A and the Ink B, the solid image chart was printed in such a manner that each amount of the Ink A and the Ink B was equal.

Evaluation Criteria

G (Good): No image peeling-off

M (Marginal): Slight image peeling-off at the end of image

P (Poor): Image peeling-off observed

Discharging Stability

A chart of solid image having an area ratio of 5 percent of A4 size paper per color created by MICROSOFT WORD 2000 was continuously printed on MyPaper (manufactured by RICOH Company LTD.) with a run length of 200 sheets. Disturbance of ink discharging by each nozzle after the printing was observed to evaluate the discharging stability. The print mode used was "no color calibration" modified from "Plain Paper-Standard Fast" at the user setting for plain paper by a driver installed on the printer.

Evaluation Criteria

G (Good): No discharging disturbance

M (Marginal): Slight discharging disturbance

P (Poor): Discharging disturbance observed or no discharging occurred

Maintenance Property

In an environment in which the temperature and moisture were controlled within the range of 31.5 degrees C.-32.5 degrees C. and 25 percent RH-35 percent RH, using an inkjet printer (IPSiO GXe-5500, manufactured by RICOH Company LTD.), the drive voltage of piezoelectric element was changed to set the discharging amount of the ink equal so that the same amount of the ink was attached to recording media. Next, images were formed in the print mode of the inkjet recording device set to [Plain paper fast] and [Gloss paper fast]. After recording was continued for 50 hours with head cleaning every two hours, the maintenance property was evaluated.

Accumulation of Waste Ink

Ink attachment around the maintenance unit and nozzle cover was observed after the continuous printing.

Evaluation Criteria

G (Good): Waste ink in maintenance unit was flowable and no ink fixation around nozzle cover was observed M (Marginal): Waste ink in maintenance unit was slightly flowable and ink fixation occurred around nozzle cover, causing no practical problem P (Poor): Waste ink in maintenance unit was not flowable and ink fixation around nozzle cover accumulated, causing a problem such that the ink was abraded on medium.

Evaluation on Clogging in Nozzle

Nozzle check patterns were printed after the continuous printing and the number of non-discharging nozzles was counted.

Evaluation Criteria

G (Good): No non-discharging nozzle

M (Marginal): Number of non-discharging nozzle was less than 15 percent

P (Poor): Number of non-discharging nozzle was not less than 15 percent

Storage Stability of Ink Mixing

Storage Stability of Ink Mixing

Each ink set was put in a polyethylene container in such a manner that the mass ratio of the Ink A and the Ink B therein was 1 to 1 and the container was sealed. After storing the ink set at 70 degrees C. for two weeks, the volume average particle diameter (D50) and viscosity were measured. The storage stability of ink mixing was evaluated by the variation between before and after the storage according to the following criteria.

G (Good): 5 percent or less

M (Marginal): less than 10 percent

P (Poor): Not less than 10 percent

TABLE 4

| | Ink set | | | | | | Abrasion resistance | | |
|---|---|---|---|---|---|---|---|---|---|
| | Ink A (ink containing amine compound) | | | Ink B (ink containing resin-coated pigment) | | Resin- | | | Ink A + |
| | | | | | | coated | Ink A | Ink B | Ink B |
| | Ink No. | Content of amine compound | Content of resin particle | Resin particle/ amine compound | Ink No. | Resin-coated pigment | pigment/ amine compound | mono-color portion | mono-color portion | Mixed color portion |
| Example 1 | 1 | 0.1 | 3.0 | 30.0 | 4 | 4 | 40 | G | G | G |
| Example 2 | 18 | 0.1 | 3.5 | 35.0 | 6 | 4 | 40 | G | G | G |
| Example 3 | 19 | 0.2 | 4.0 | 20.0 | 6 | 4 | 20 | G | G | G |
| Example 4 | 10 | 0.4 | 5.0 | 12.5 | 4 | 4 | 10 | G | G | G |
| Example 5 | 12 | 0.2 | 6.0 | 30.0 | 5 | 5 | 25 | M | M | M |

TABLE 4-continued

| | Ink No. | Content of amine compound | Content of resin particle | Resin particle/amine compound | Ink No. | Resin-coated pigment | Resin-coated pigment/amine compound | | | |
|---|---|---|---|---|---|---|---|---|---|---|
| Example 6 | 14 | 0.2 | 2.0 | 10.0 | 6 | 4 | 20 | M | G | G |
| Example 7 | 11 | 0.3 | 5.0 | 16.7 | 6 | 4 | 13 | M | G | M |
| Example 8 | 13 | 0.2 | 4.0 | 20.0 | 4 | 4 | 20 | M | G | M |
| Example 9 | 15 | 0.1 | 2.5 | 25.0 | 5 | 5 | 50 | G | M | G |
| Example 10 | 9 | 0.1 | 4.0 | 40.0 | 6 | 4 | 40 | G | G | G |
| Example 11 | 21 | 0.03 | 2.00 | 66.7 | 4 | 4 | 133 | M | G | G |
| Example 12 | 2 | 0.04 | 4.00 | 100.0 | 24 | 5 | 125 | G | M | G |
| Example 13 | 20 | 0.2 | 3.0 | 15.0 | 6 | 4 | 20 | M | G | G |
| Example 14 | 2 | 0.04 | 4.00 | 100.0 | 3 | 6 | 150 | G | G | G |
| Example 15 | 2 | 0.04 | 4.00 | 100.0 | 6 | 4 | 100 | G | G | G |
| Comparative Example 1 | 7 | 0.2 | 3.0 | 15.0 | 4 | 4 | 20 | P | G | P |
| Comparative Example 2 | 16 | 0.1 | 4.0 | 40.0 | 4 | 4 | 40 | G | G | G |
| Comparative Example 3 | 17 | 0.2 | 3.0 | 15.0 | 5 | 5 | 25 | G | M | G |
| Comparative Example 4 | 22 | 5.1 | 4.0 | 0.8 | 6 | 4 | 1 | G | G | G |
| Comparative Example 5 | 23 | 0.02 | 3.00 | 150.0 | 4 | 4 | 200 | M | G | M |
| Comparative Example 6 | 1 | 0.1 | 3.0 | 30.0 | 8 | — (surfactant dispersion) | — | M | P | P |
| Comparative Example 7 | 10 | 0.4 | 5.0 | 12.5 | 25 | 3.5 | 9 | G | M | G |
| Comparative Example 8 | 2 | 0.04 | 4.00 | 100.0 | 26 | 8.5 | 213 | G | G | G |

| | Ink set | | | | | | | | |
|---|---|---|---|---|---|---|---|---|---|
| | Ink A (ink containing amine compound) | | | | Ink B (ink containing resin-coated pigment) | | Resin-coated pigment/amine compound | Maintenance property | |
| | Ink No. | Content of amine compound | Content of resin particle | Resin particle/amine compound | Ink No. | Resin-coated pigment | | Accumulation of waste ink | Clogging in nozzle |
| Example 1 | 1 | 0.1 | 3.0 | 30.0 | 4 | 4 | 40 | G | G |
| Example 2 | 18 | 0.1 | 3.5 | 35.0 | 6 | 4 | 40 | G | G |
| Example 3 | 19 | 0.2 | 4.0 | 20.0 | 6 | 4 | 20 | G | G |
| Example 4 | 10 | 0.4 | 5.0 | 12.5 | 4 | 4 | 10 | G | G |
| Example 5 | 12 | 0.2 | 6.0 | 30.0 | 5 | 5 | 25 | G | G |
| Example 6 | 14 | 0.2 | 2.0 | 10.0 | 6 | 4 | 20 | G | G |
| Example 7 | 11 | 0.3 | 5.0 | 16.7 | 6 | 4 | 13 | G | G |
| Example 8 | 13 | 0.2 | 4.0 | 20.0 | 4 | 4 | 20 | G | G |
| Example 9 | 15 | 0.1 | 2.5 | 25.0 | 5 | 5 | 50 | G | M |
| Example 10 | 9 | 0.1 | 4.0 | 40.0 | 6 | 4 | 40 | M | G |
| Example 11 | 21 | 0.03 | 2.00 | 66.7 | 4 | 4 | 133 | M | M |
| Example 12 | 2 | 0.04 | 4.00 | 100.0 | 24 | 5 | 125 | M | G |
| Example 13 | 20 | 0.2 | 3.0 | 15.0 | 6 | 4 | 20 | M | M |
| Example 14 | 2 | 0.04 | 4.00 | 100.0 | 3 | 6 | 150 | M | G |
| Example 15 | 2 | 0.04 | 4.00 | 100.0 | 6 | 4 | 100 | M | G |
| Comparative Example 1 | 7 | 0.2 | 3.0 | 15.0 | 4 | 4 | 20 | P | M |
| Comparative Example 2 | 16 | 0.1 | 4.0 | 40.0 | 4 | 4 | 40 | P | P |
| Comparative Example 3 | 17 | 0.2 | 3.0 | 15.0 | 5 | 5 | 25 | P | M |
| Comparative Example 4 | 22 | 5.1 | 4.0 | 0.8 | 6 | 4 | 1 | P | M |
| Comparative Example 5 | 23 | 0.02 | 3.00 | 150.0 | 4 | 4 | 200 | P | G |
| Comparative Example 6 | 1 | 0.1 | 3.0 | 30.0 | 8 | — (surfactant dispersion) | — | P | M |
| Comparative Example 7 | 10 | 0.4 | 5.0 | 12.5 | 25 | 3.5 | 9 | P | M |
| Comparative Example 8 | 2 | 0.04 | 4.00 | 100.0 | 26 | 8.5 | 213 | P | G |

TABLE 4-continued

| | Ink set | | | | | | | |
|---|---|---|---|---|---|---|---|---|
| | Ink A (ink containing amine compound) | | | | Ink B (ink containing resin-coated pigment) | | | |
| | Ink No. | Content of amine compound | Content of resin particle | Resin particle/ amine compound | Ink No. | Resin-coated pigment | Resin-coated pigment/ amine compound | Discharging stability | Storage stability of ink mixing |
| Example 1 | 1 | 0.1 | 3.0 | 30.0 | 4 | 4 | 40 | G | G |
| Example 2 | 18 | 0.1 | 3.5 | 35.0 | 6 | 4 | 40 | G | G |
| Example 3 | 19 | 0.2 | 4.0 | 20.0 | 6 | 4 | 20 | G | G |
| Example 4 | 10 | 0.4 | 5.0 | 12.5 | 4 | 4 | 10 | G | G |
| Example 5 | 12 | 0.2 | 6.0 | 30.0 | 5 | 5 | 25 | G | G |
| Example 6 | 14 | 0.2 | 2.0 | 10.0 | 6 | 4 | 20 | G | M |
| Example 7 | 11 | 0.3 | 5.0 | 16.7 | 6 | 4 | 13 | M | G |
| Example 8 | 13 | 0.2 | 4.0 | 20.0 | 4 | 4 | 20 | G | G |
| Example 9 | 15 | 0.1 | 2.5 | 25.0 | 5 | 5 | 50 | M | M |
| Example 10 | 9 | 0.1 | 4.0 | 40.0 | 6 | 4 | 40 | M | M |
| Example 11 | 21 | 0.03 | 2.00 | 66.7 | 4 | 4 | 133 | G | G |
| Example 12 | 2 | 0.04 | 4.00 | 100.0 | 24 | 5 | 125 | G | M |
| Example 13 | 20 | 0.2 | 3.0 | 15.0 | 6 | 4 | 20 | G | G |
| Example 14 | 2 | 0.04 | 4.00 | 100.0 | 3 | 6 | 150 | G | M |
| Example 15 | 2 | 0.04 | 4.00 | 100.0 | 6 | 4 | 100 | G | M |
| Comparative Example 1 | 7 | 0.2 | 3.0 | 15.0 | 4 | 4 | 20 | M | P |
| Comparative Example 2 | 16 | 0.1 | 4.0 | 40.0 | 4 | 4 | 40 | M | P |
| Comparative Example 3 | 17 | 0.2 | 3.0 | 15.0 | 5 | 5 | 25 | M | P |
| Comparative Example 4 | 22 | 5.1 | 4.0 | 0.8 | 6 | 4 | 1 | G | M |
| Comparative Example 5 | 23 | 0.02 | 3.00 | 150.0 | 4 | 4 | 200 | M | P |
| Comparative Example 6 | 1 | 0.1 | 3.0 | 30.0 | 8 | — (surfactant dispersion) | — | M | P |
| Comparative Example 7 | 10 | 0.4 | 5.0 | 12.5 | 25 | 3.5 | 9 | P | P |
| Comparative Example 8 | 2 | 0.04 | 4.00 | 100.0 | 26 | 8.5 | 213 | P | M |

Moreover, image forming, recording, printing, modeling, etc. in the present disclosure represent the same meaning.

According to the present disclosure, an ink set can be provided with which images can be recorded on not only plain paper but also gloss paper with good abrasion resistance.

Also, the ink set has good discharging property for a head nozzle and good maintenance property at the same time.

Having now fully described embodiments of the present invention, it will be apparent to one of ordinary skill in the art that many changes and modifications can be made thereto without departing from the spirit and scope of embodiments of the invention as set forth herein.

What is claimed is:
1. An ink set comprising:
an ink A, comprising water, an organic solvent A, a self-dispersible pigment, an anionic resin particle, and an amine compound having a boiling point of 120-200 degrees C.; and
an ink B, comprising water, an organic solvent B, and a resin-coated pigment,
wherein, a mass content ratio of the anionic resin particle to the amine compound in the ink A is from 10:1 to 100:1, and
a mass content ratio of the resin-coated pigment to the amine compound in the ink A is from 10:1 to 150:1.

2. The ink set according to claim 1, wherein the anionic resin particle has a volume average particle diameter (Dv) of 10-200 nm.

3. The ink set according to claim 1, wherein the anionic resin particle has a volume average particle diameter (Dv) of 10-50 nm.

4. The ink set according to claim 1, wherein the anionic resin particle comprises a urethane resin particle.

5. The ink set according to claim 1, wherein the anionic resin particle comprises a polycarbonate-based urethane resin particle or a polyester-based urethane resin particle.

6. The ink set according to claim 1, wherein the mass content ratio of the anionic resin particle to the amine compound in the ink A is from 10:1 to 50:1.

7. The ink set according to claim 1, wherein the mass content ratio of the resin-coated pigment to the amine compound in the ink A is from 20:1 to 100:1.

8. The ink set according to claim 1, wherein a molecular mass of the amine compound is not greater than 100.

9. The ink set according to claim 1, wherein the ink A is black ink and the ink B is color ink.

10. An image forming method comprising:
applying at least one kind of stimulus selected from the group consisting of heat, pressure, and vibration to each ink of the ink set of claim 1 to jet said each ink; and
recording an image on a print medium.

11. An image forming apparatus comprising:
a discharging head configured to discharge the ink A and the ink B of the ink set of claim 1; and ink accommodating units configured to individually accommodate the ink A and the ink B.

12. The ink set according to claim 1, wherein the amine compound is a compound selected from the group consisting of 1-amino-2-propanol, 3-amino-1-propanol, 2-amino-2-mthyl-1-propanol, N-methyl ethanol amine, N,N-dimethyl-ethanol amine, and 2-amino-2-methyl-1,3-propane diol.

13. The ink set according to claim 1, wherein a proportion of a total amount of the organic solvent A in ink A, based on a total mass content of ink A is from 10 to 60 percent by mass, and a proportion of a total amount of the organic solvent B in the ink B, based on a total mass content of ink B, is from 10 to 60 percent by mass.

14. The ink set according to claim 1, wherein ink A and ink B have a viscosity at 25 degrees C. of from 5 to 30 mPa·s, and a surface tension of 35 mN/m or less.

15. The ink set according to claim 1, wherein ink A and ink B have a pH of from 8 to 11.

16. The ink set according to claim 1, wherein a mass content of the amine compound is from 0.01-5 percent by mass based on a total mass content of ink A.

17. The ink set according to claim 1, wherein the amine compound of the ink A is substituted as a counter ion of the anionic resin particle and prevents evaporation of the counter ion of the anionic resin particle.

* * * * *